United States Patent Office.

RUFUS K. BLODGETT, OF NEAR FULTON, ILLINOIS.

Letters Patent No. 71,961, dated December 10, 1867.

IMPROVED SUBSTITUTE FOR MILK FOR CATTLE.

*The Schedule referred to in these Letters Patent and making part of the same.*

TO ALL WHOM IT MAY CONCERN:

Be it known that I, RUFUS K. BLODGETT, of near Fulton, Whitesides county, and State of Illinois, have invented a new and useful Feed for Stock, to be used instead of milk; and I do hereby declare that the following is a full, clear, and exact description of the manner of constructing, mixing, cooking, and feeding said feed, reference being had to the articles contained in the vials marked with the name of the several ingredients.

The object of my invention is to accomplish the successful raising of stock without nursing, thereby saving the milk for dairy purposes, and securing greater convenience in feeding the young; also to cause the stock to thrive as well as when receiving nourishment from its dam.

In order to enable others to successfully make this feed, I will proceed carefully to describe its preparation.

I take the following ingredients, and in proportions as follows: To one pound of flour of wheat, oats, rye, or barley, I add six drachms of clay, and one half drachm of catechu. These I thoroughly mix in a dry state, then add water in such quantity as to render it sufficiently thin for the animal to drink easily. When the stock is young, I carefully cook it by placing it in a kettle over a fire, and thoroughly scalding it, or by pouring and stirring boiling water over it, afterwards reducing it to a proper consistency and temperature by the addition of cold water. After it is thus properly prepared, I feed it to the stock in precisely the same manner as milk.

Now, the object of the various ingredients is severally as follows: I use the flour as the nutritive property. This alone would be too laxative, and in order to counteract this laxative tendency, I add the catechu, which is a powerful astringent. Further, it is a well-known fact that all ruminating animals re-chew their food, and if only the flour, catechu, and water were used, it would not be properly retained in the mouth of the animal, but would pass out. Now, to overcome this, I add the clay, which I have found, from repeated experiments during the past few months, works well. This clay also gives to the preparation an agreeable flavor, and destroys the raw taste of the ingredients, causing the animal to drink it readily.

What I claim as my invention, and desire to secure by Letters Patent, is—

1. The use of white or blue clay, when used for the purpose above specified.
2. The combination of flour, catechu, and clay, when mixed and used for the purposes above set forth.

RUFUS K. BLODGETT.

Witnesses:
 WM. W. SANBORN,
 JNO. W. McLEOD.